(12) United States Patent
Venkatachalam et al.

(10) Patent No.: US 7,158,072 B1
(45) Date of Patent: Jan. 2, 2007

(54) ETHERNET CONNECTION OF AIRBORNE RADAR OVER FIBER OPTIC CABLE

(75) Inventors: Ranganath Venkatachalam, Cedar Rapids, IA (US); Ronald W. Andreatta, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/517,913

(22) Filed: Sep. 8, 2006

(51) Int. Cl.
G01S 13/86 (2006.01)
G01S 13/95 (2006.01)
G01S 7/00 (2006.01)
G01S 13/00 (2006.01)

(52) U.S. Cl. .............. 342/26 B; 342/26 R; 342/52; 342/54; 342/58; 342/60; 342/175; 342/176; 342/195

(58) Field of Classification Search .......... 398/135, 398/140, 141; 244/3.1, 3.11, 3.13, 3.15–3.18; 342/13–16, 25 R–26 D, 52–60, 82–103, 342/175–186, 195
See application file for complete search history.

(56) References Cited

U.S. PATENT DOCUMENTS

| | | | | |
|---|---|---|---|---|
| 2,995,740 A | * | 8/1961 | Shreckengost | 342/58 |
| 3,533,104 A | * | 10/1970 | Sincerbox et al. | 342/58 |
| 4,808,999 A | * | 2/1989 | Toman | 342/15 |
| 5,031,234 A | * | 7/1991 | Primas et al. | 398/135 |
| 5,035,375 A | * | 7/1991 | Friedenthal et al. | 342/58 |
| 5,265,024 A | * | 11/1993 | Crabill et al. | 342/26 A |
| 5,296,860 A | * | 3/1994 | Li | 342/58 |
| 5,583,972 A | * | 12/1996 | Miller | 342/26 D |
| RE35,553 E | * | 7/1997 | Li | 342/13 |
| 5,955,983 A | * | 9/1999 | Li | 342/54 |
| 6,011,506 A | * | 1/2000 | Li | 342/54 |
| 6,014,606 A | * | 1/2000 | Tu | 342/26 A |
| 6,107,954 A | * | 8/2000 | Li | 342/54 |
| 6,480,144 B1 | * | 11/2002 | Miller et al. | 342/195 |
| 6,864,828 B1 | * | 3/2005 | Golubiewski et al. | 342/25 C |
| 6,977,608 B1 | * | 12/2005 | Anderson et al. | 342/26 B |
| 7,032,858 B1 | * | 4/2006 | Williams | 244/3.15 |
| 7,039,505 B1 | * | 5/2006 | Southard et al. | 342/26 A |
| 2002/0109623 A1 | * | 8/2002 | Ware | 342/26 R |

* cited by examiner

Primary Examiner—Bernarr E. Gregory
(74) Attorney, Agent, or Firm—Nathan O. Jensen; Kyle Eppele

(57) ABSTRACT

A weather radar signal path for an aircraft. The signal path has an antenna, a digital down-converter, a first transceiver, fiber optic cabling, a second transceiver and a processing unit. The antenna is adapted to, in a first mode, receive reflected radar signals from atmosphere ahead. The digital down-converter is adapted to convert the reflected radar signals received by the antenna into digital radar signals at a lower frequency. The first transceiver is adapted to, in the first mode, at least transmit the digital radar signals through said fiber optic cabling. The fiber optic cabling is adapted to, in the first mode, transfer the digital radar signals between the first and second transceivers. The second transceiver is adapted to, in the first mode, receive said digital radar signals from the fiber optic cabling. The processing unit is adapted to, in the first mode, process the digital radar signals to generate weather information based on predetermined algorithm.

20 Claims, 5 Drawing Sheets

ETHERNET CONNECTION OF AIRBORNE RADAR OVER FIBER OPTIC CABLE

FIELD OF THE INVENTION

The present invention relates to aircraft weather radar systems, and more particularly relates to the communication links of the weather radar unit between the antenna in the radome and the processing array in the electronic bay.

ART BACKGROUND

Weather radars are quite common in modern avionics technologies. From the nose section of an aircraft, an area commonly referred to as the "radome," waves of microwave pulses are sent out by the weather radar in a beam or sweeping pattern in order to detect the weather conditions up ahead. When the detected signals are bounced back, they are received by an antenna at the front tip of the aircraft. The received signals are then transmitted to an electronic bay, where electric power and a processing array of the radar unit are provided. Based on the reflected radar pulse energy upon interaction with air and water molecules, the processing array can map out weather information such as rain and wind shears for the pilot.

The forward antenna unit sits at the nose section of the aircraft, while the processing array is housed in an electronic bay, some distance away from the nose. To communicate between the antenna unit and the electronic bay, a conventional airborne weather radar system aims to address at least three significant issues. First, electric power must be supplied to the antenna for its various movements, which require mechanical operation. Second, control information from the processing array needs to be communicated to the antenna in order for the antenna to perform the desired sweeping or tilting movements. Finally, return data received by the antenna must be communicated back to the processing array to allow the pilot to see the weather condition ahead of where the plane is traveling.

The performance goal of such a communication link is to increase bandwidth, improve signal-to-noise ratio and achieve higher resolution. However, the conventional radar systems have their shortcomings. For one thing, in a conventional system, signals are conducted from the antenna to a receiver (at the processing array) through a waveguide, which typically incurs a 2–5 dB loss in transmission. As more radar data are utilized due to advances in radar detection algorithm and technology, such loss becomes unacceptable and can degrade the overall performance. Also, different aircraft installations cause large variations of the length of a waveguide, depending on the location of the receiver and the electronic bay. This variability of waveguide-induced loss further degrades radar system performance. Worse, as the waveguide installation is lengthened, the weight of the installation also becomes an issue.

Therefore, it is desirable to be able to more efficiently transfer the received radar signals from the antenna to the receiver and the processing array. The increased efficiency should also facilitate the handling of increased radar data requirement.

It is also desirable to provide a communication link and signal path that is more EMI- and lightning-resistant and tolerant.

It is further desirable to provide a communication link and signal path which can be made much lighter in weight than the conventional waveguide installation.

SUMMARY OF THE INVENTION

An Ethernet connection of airborne radar systems over a fiber optic cable link is disclosed. The invention uses a fiber optic cable signal path to meet the increased radar throughput requirement. By digitizing the radar pulse pairs in high proximity to the antenna/receiver and replacing waveguide transmission of analog signals with fiber optic cable transmission of digital data, many advantages can be realized. First, the use of the lossy waveguide is minimized. The loss variability is also eliminated. Further, the signal-to-noise ratio is significantly improved due to the use of the Ethernet connection over a fiber optic cable link.

In one embodiment of the invention, Ethernet data communication protocol is used to encode the data for reliable transmission between the antenna unit and the processing array. The frame check sequence provided by Ethernet is used to ensure that only high-integrity data are received by the processing array. A uniquely numbered series of Ethernet UDP/IP datagrams is used to guarantee correct sequential reception of data over the fiber optic cable link.

In another embodiment of the invention, the weather radar signal path for an aircraft has an antenna, a digital down-converter, a first transceiver, fiber optic cabling, a second transceiver and a processing unit. The antenna is adapted to, in a first mode, receive reflected radar signals from atmosphere ahead. The digital down-converter is adapted to convert the reflected radar signals received by the antenna into digital radar signals at a lower frequency. The first transceiver is adapted to, in the first mode, at least transmit the digital radar signals through said fiber optic cabling. The fiber optic cabling is adapted to, in the first mode, transfer the digital radar signals between the first and second transceivers. The second transceiver is adapted to, in the first mode, receive said digital radar signals from the fiber optic cabling. The processing unit is adapted to, in the first mode, process the digital radar signals to generate weather information based on predetermined algorithm.

BRIEF DESCRIPTION OF THE DRAWINGS

Additional objects, features and advantages of the present invention will become apparent from the following disclosure, wherein:

FIGS. 2 (*b*) and (*c*) illustrate some exemplary interconnect schemes for additional detection sensors.

DETAILED DESCRIPTION OF THE PREFERRED EMBODIMENT

A system and method for an Ethernet connection of airborne radar systems over a fiber optic cable link is disclosed. In the description that follows, numerous specific details are set forth in detail to provide a more thorough understanding of the present invention. It will be apparent, however, to one ordinarily skilled in the art that the present invention may be practiced without these specific details. In other instances, well-known features have not been described in detail so as not to obscure the present invention.

Figure 1:
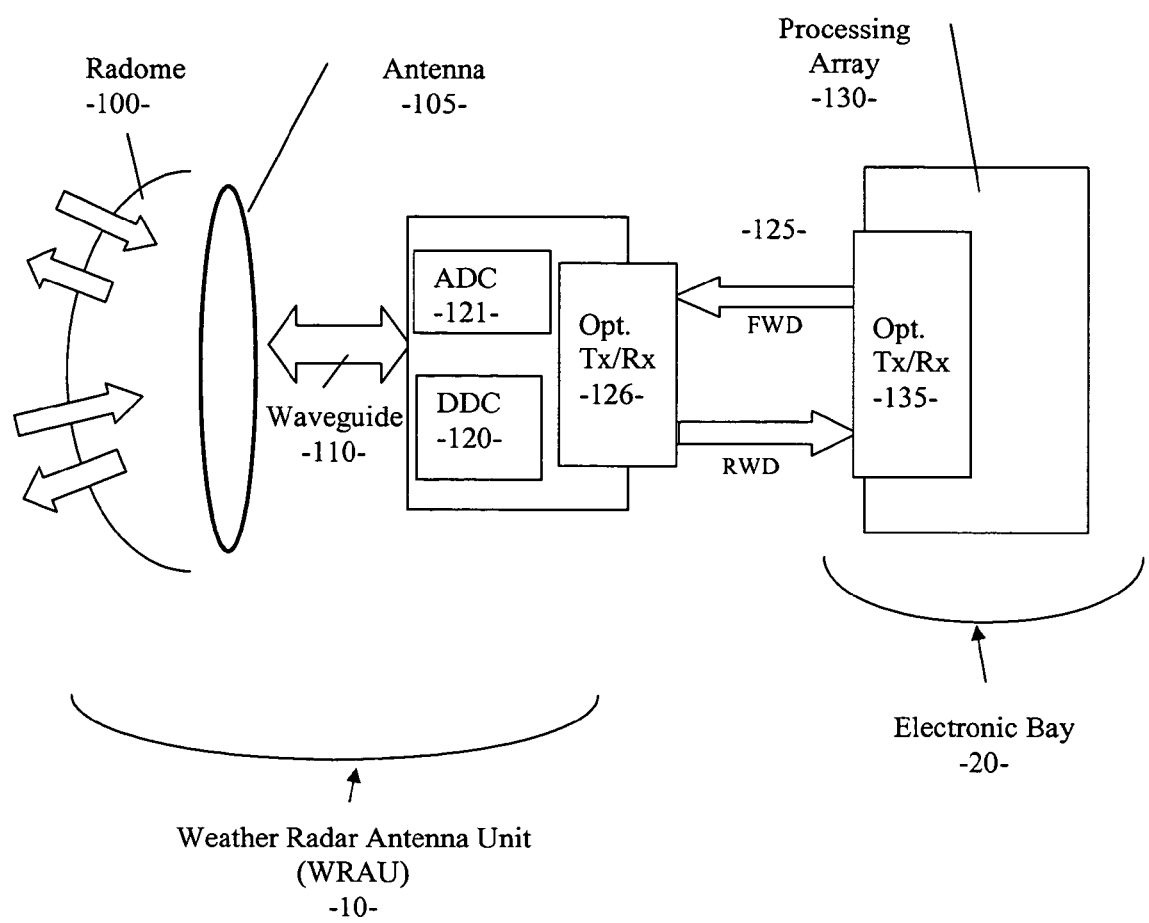
FIG. 1 illustrates a simplified diagram of the exemplary weather radar system in accordance with the present invention.

Reference is first made to FIG. 1, where a simplified diagram of the weather radar system in accordance with the present invention is shown. It should be noted that the simplified FIG. 1 only shows the functional blocks that are germane to the understanding of the present invention. As illustrated, an antenna unit 105 is placed inside the radome 100 at the front tip of an aircraft. A digital down-converter ("DDC") 120 is coupled to the antenna unit 105 through a waveguide 110, forming a weather radar antenna unit 10 ("WRAU"). An analog-to-digital converter ("ADC") 121 is provided to convert the received radar signals into their digital translation for data preparation and transmission. Through optical transceivers 126, 135 at both ends, a fiber optic cable 125 connects the WRAU 10 to a processing array 130 situated in the electronic bay 20 of the aircraft. The optical transceivers 126, 135 serve as an interface between the WRAU 10 and fiber optic cable 125, and between the fiber optic cable 125 and processing array 130, respectively.

In the forward path ("FWD"), i.e. from the electronic bay 20 to the WRAU 10, control signals are transmitted in order to operate the antenna 105. In the rearward path ("RWD"), from the WRAU 10 to the electronic bay 20, digital translation of the radar return signals are transmitted to the electronic bay 20, so that weather algorithm can be applied to the signals. The result of the weather data processing is communicated to the pilot via a display in the cockpit (not shown).

Figure 2:
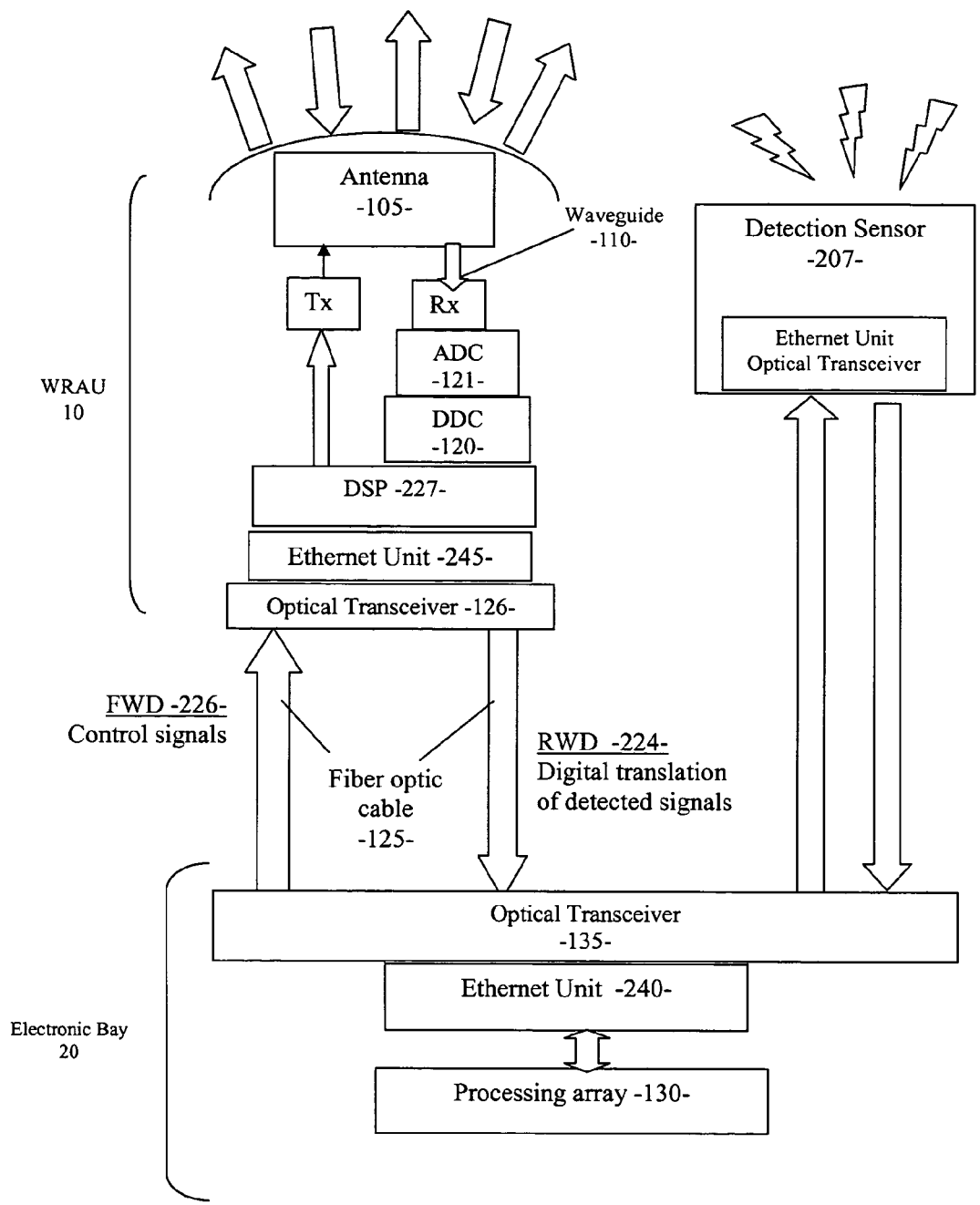
FIG. 2 (*a*) illustrates a simplified block diagram of the exemplary weather radar system in accordance with the present invention.
Figure 2:
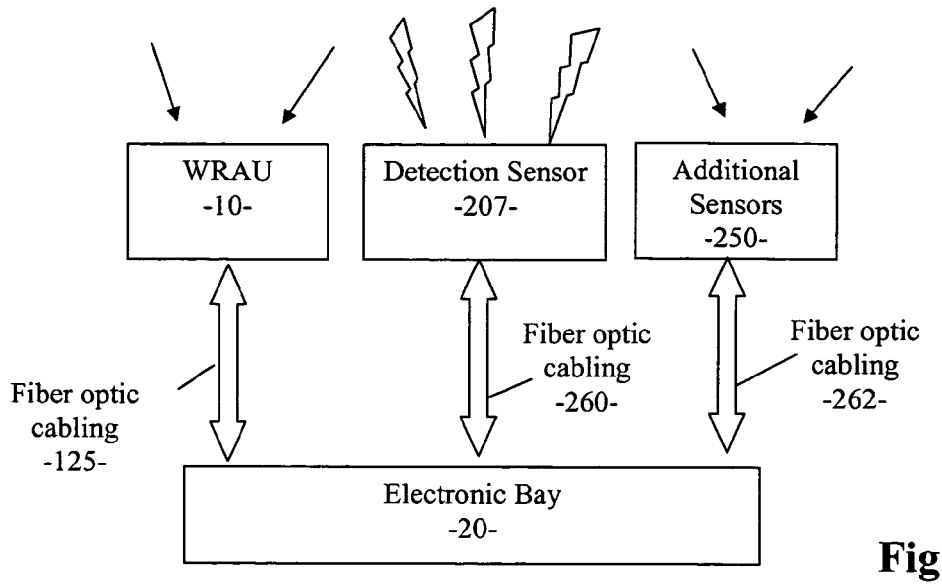
Figure 2:
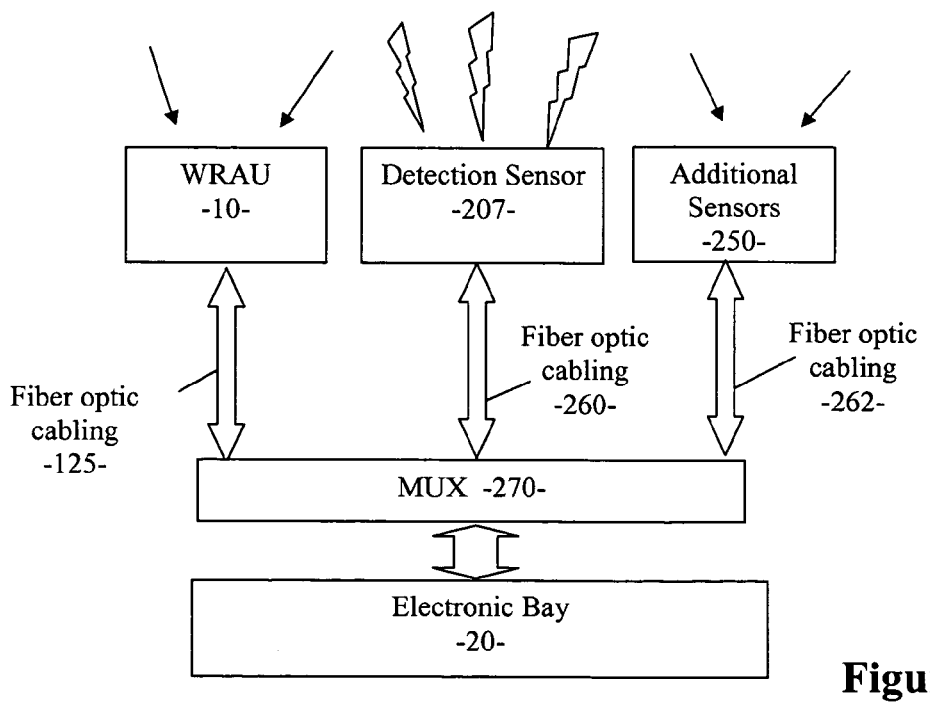

To illustrate the invention in more detail, reference is now made to FIG. 2, where a simplified block diagram of the weather radar system in accordance with the invention is shown. As shown, the reflected radar signals are picked up by the antenna 105 at the front tip of the aircraft. The reflected signals are transmitted through the waveguide 110 and received by a receiver Rx. The received signals are then converted to a digital format at baseband and decimated to generate a digital translation of the radar data, through the analog-digital converter ("ADC") 121 and digital down-converter ("DDC") 120. The digital data from the DDC 120 are formatted into data packets, as directed by the DSP 227, by the Ethernet unit 245 for transmission through the physical layer. Upon formatting and encoding, the radar return data are transmitted to the fiber optic cable 125 in the RWD path 224 and eventually to the processing array 130. After transmission through the fiber optic cable 125, the radar data are first received by the optical transceiver 135 and decoded by the Ethernet unit 240 so that the weather data can be analyzed by the processing array 130. As can be understood by those skilled in the art, the Ethernet unit 240 receives the RWD signals from the fiber optic cable 125 and ensures that they are optimally decoded and conveyed to the processing array 130. Currently, the Ethernet unit 240 is implemented with off-the-shelf LAN ("local area network") components, such as SMSC LAN91C111 MAC & PHY, and Broadcom 5221 External PHY. It should be appreciated by those skilled in the art that other off-the-shelf parts LAN or Ethernet components are available for delivering data in accordance with the present invention.

In terms of the preferable data format for transmission through the fiber optic cable 125, currently UDP/IP datagrams are used. As is well known, UDP/IP datagrams are more basic and efficient than their more sophisticated cousin, TCP/IP. The UDP/IP protocol functions well in a simple point-to-point, uni-cast configuration, making it quite suitable for this avionics environment. TCP/IP, on the other hand, would have added more software complexity and overhead, thus gaining re-try capability at the expense of time delay. It should be noted that other transmission protocols can be readily utilized, provided that they meet the aforementioned basic design considerations of this avionics application, without the overdoing.

It should also be noted that instead of a pair of fiber optic cables, a full duplex fiber optic cable may be utilized to provide both the FWD and RWD signal paths. In comparison to signal paths formed by metal cabling, coaxial or non-fiber optic cabling, the fiber optic cable is known to be more advantageous in terms of weight and interference immunity.

Reference is still to the forward signal path of FIG. 2. The processing array 130, which has operation modes controllable by the pilot, generates control signals based on the modes selected by the pilot and propagates the control signals through the fiber optic cables 125 in the FWD direction 226 to the WRAU 10. The control signals, as can be appreciated by those skilled in the art, preferably control the sweeping angles of the antenna 105 or command the antenna 105 to certain operation mode, e.g. wind shear during takeoff and landing, or weather processing. The control signals are received by the optical transceiver 126/ Ethernet unit 245, and decoded by the DSP 227 so that they can operate the antenna 105. By sending the control signals to the WRAU 10 through the fiber optic cable 226, the signals can be optimally conveyed, protected from RF interference.

By using the fiber optic cable 125, cable-induced EMI and RFI is eliminated. As such, the weather radar system may even be optionally implemented with additional sensor systems, for example, a lightning detection sensor 207 as shown in FIG. 2. It should be noted that virtually any detection sensor systems that require the detection signals to be transmitted to the electronic bay 20 for further processing may take advantage of the fiber optic cabling in accordance with the present invention. In one embodiment, as illustrated in FIG. 2 (b), the detected signals from the sensors 207, 250 are transmitted to the fiber optic cable 260, 262, respectively, connected between the detection sensor systems and the electronic bay 20. In other embodiment, such as one illustrated in FIG. 2 (c), the detection signals may be multiplexed with the cabling 125, such that the interface between the electronic bay 20 and the cabling is simplified by the use of the MUX 270. While FIGS. 2 (a)–(c) illustrate some exemplary interconnect schemes, those skilled in the art should be able to design the most effective cabling and interconnect schemes based on their system requirements. With conventional copper wiring, surface current or magnetic field would have easily traveled through and around any aperture on the aircraft, and be picked up by the copper wiring. In contrast, fiber optic cabling offers immunity against indirect effects of lightning and EMI between the antenna 105, DDC 120 and the processing array 130.

Figure 3:
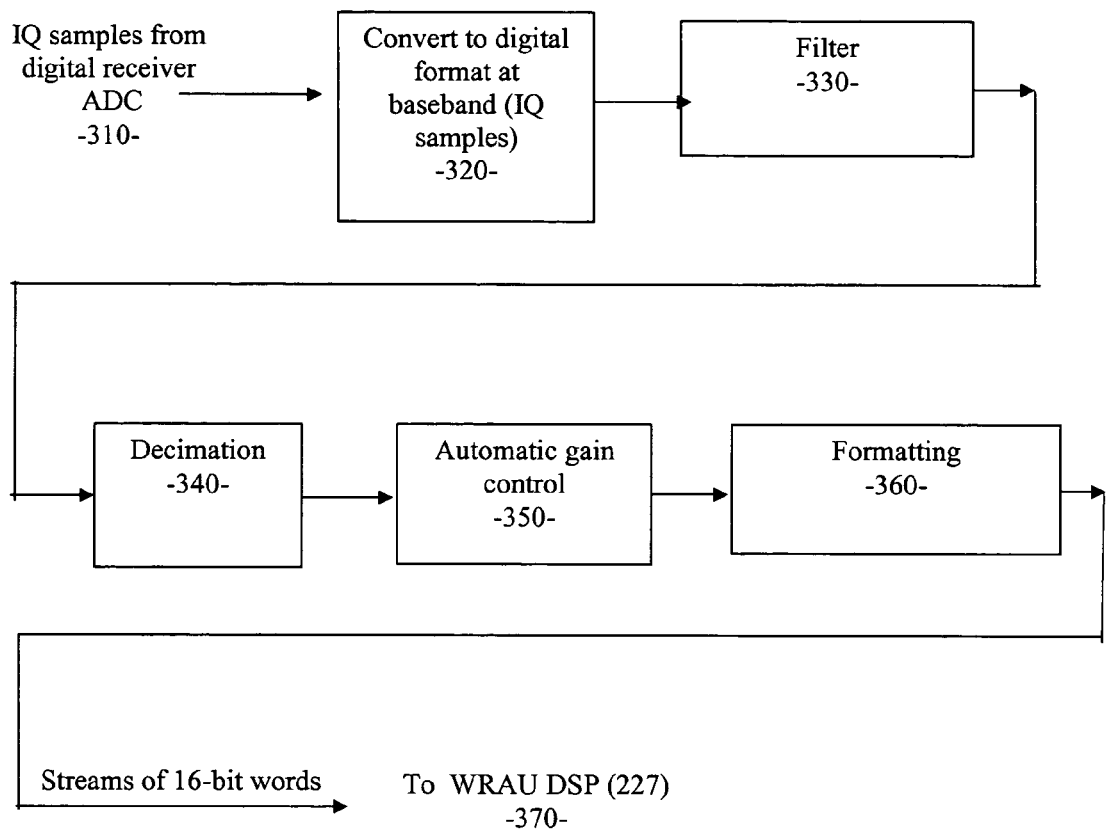
FIG. 3 illustrates a simplified functional block diagram of the exemplary DDC 120.

Reference is now turned to FIG. 3, where a simplified functional block diagram of the DDC 120 is further illustrated. Currently implemented in an FPGA ("field-programmable gate array") device, the DDC is preferably designed to bridge the gap between the high-speed digital receiver ADC (FIG. 2, 121) and the digital receiver DSP (FIG. 2, 227). The DDC's main functions are to first convert the sampled received signal from the antenna to a digital format, i.e. in-phase/out-of-phase Quadrature samples, at baseband (blocks 310, 320). The received data are then filtered using a CIC ("cascaded integrator-comb") filter and a FIR ("finite impulse-response") filter (block 330), the operation of which are well-known in the area such as wireless base station technology. The sample rate of the filtered data is decimated from 9.3 GHz down to preferably about 1 MHz (block 340). After decimation, automatic gain control is implemented (block 350) and the digital down-converted data are formatted and sent to the antenna's DSP (FIG. 2, 227) in streams of 16-bit words containing the digital radar return information (block 370). Overall control of the DDC functions (FIG. 2, 120) is provided by the DSP (FIG. 2, 227) in order to maintain time coherency and synchronization in the WRAU 10.

Figure 4:
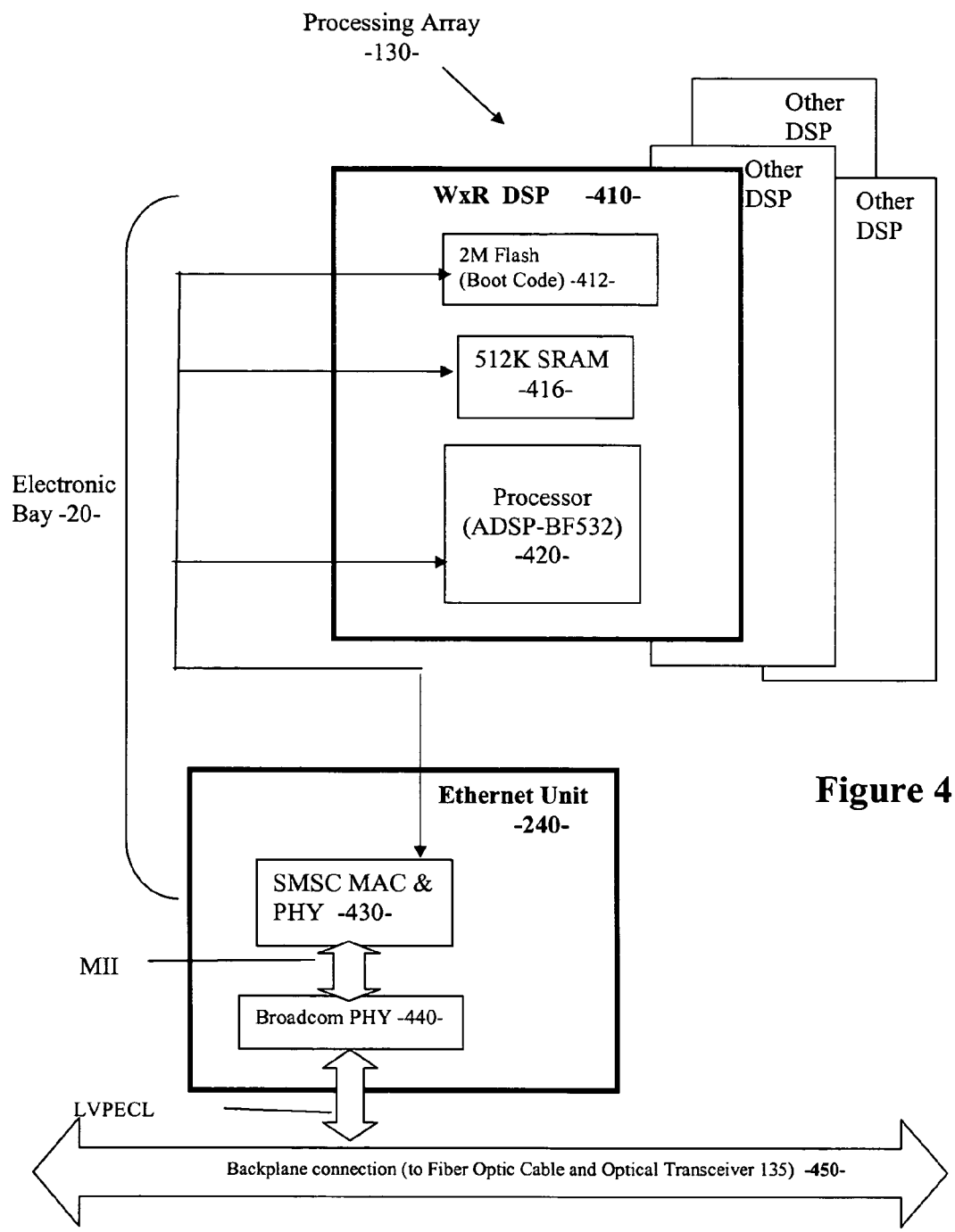
FIG. 4 illustrates a simplified block diagram of the exemplary DSP and Ethernet Unit in WRAU 10.

Reference is now made to FIG. 4, where a simplified block diagram of the processing array 130 and Ethernet unit 240 in the electronic bay 20 is illustrated. At the electronic bay 20, among the processing array 130, the WxR DSP module 410 is implemented with Flash memory 412, SRAM 416 and a processor 420. Currently, the processor 420 is an Analog Devices ADSP-BF 532 ("Blackfin") processor. The Ethernet unit 240 is connected to the EBIU ("external bus interface unit") of the processor 420, such that the SMSC LAN91C111MAC & PHY 430 is addressable as a portion of the external memory of the processor. LVPECL is a "low-voltage positive emitter coupled logic" and is an electric signal path (through copper conductor) that connects the Broadcom 5221 PHY 440 to the backplane 450, thus to the optical transceiver 135 and fiber optic cable 125. MII is "media independent interface," for providing a parallel interface between the Ethernet MAC to the PHY.

As described, the invention has the advantage of low protocol overhead while still being Ethernet-like, thus allowing use of off-the-shelf hardware and commonly available software. Further, the fiber optic cable link can electrically isolate the antenna/receiver from the electronic bay housing the weather and wind shear algorithms. The invention greatly reduces lightning-induced transients, an important consideration for new aircraft built using composite material.

In the foregoing specification, the invention has been described with reference to specific embodiments thereof. It will, however, be evident that various modifications and changes may be made thereto without departing from the broader spirit and scope of the invention. The specification and drawings are accordingly to be regarded in an illustrative rather than a restrictive sense.

What is claimed is:

1. A weather radar signal path for an aircraft, comprising:
    an antenna (105), a digital down-converter (120, 121), a first transceiver (126), fiber optic cabling (125), a second transceiver (135) and a processing unit (130), WHEREIN,
    said antenna is adapted to, in a first mode, receive reflected radar signals from atmosphere ahead,
    said digital down-converter is coupled to said antenna, said digital down-converter is adapted to convert said reflected radar signals received by said antenna into digital radar signals at a lower frequency,
    said first transceiver is coupled to said digital down-converter, said first transceiver is adapted to, in said first mode, at least transmit said digital radar signals through said fiber optic cabling,
    said fiber optic cabling is coupled between said first transceiver and said second transceiver, said fiber optic cabling is adapted to, in said first mode, transfer said digital radar signals between said first and second transceivers,
    said second transceiver is coupled to said fiber optic cabling, said second transceiver is adapted to, in said first mode, receive said digital radar signals from said fiber optic cabling,
    said processing unit is coupled to said second transceiver, said processing unit is adapted to, in said first mode, process said digital radar signals to generate weather information based on predetermined algorithm.

2. The weather radar signal path of claim 1, further comprising:
    a waveguide (110) coupled to said antenna and said digital down-converter, said waveguide being adapted to transfer said reflected radar signals from said antenna to said digital down-converter.

3. The weather radar signal path of claim 2, further comprising:
    a first network unit coupled to said first transceiver, being adapted to, in said first mode, packetize and encode said digital radar signals for transmission by said first transceiver to said fiber optic cabling;
    a second network unit coupled to said second transceiver, being adapted to, in said first mode, decode said digital radar signals received by said second transceiver from said fiber optic cabling,
    wherein said first and second network units handle said digital radar signals according to a predetermined network protocol.

4. The weather radar signal path of claim 1, further comprising:
    a first network unit coupled to said first transceiver, being adapted to, in said first mode, packetize and encode said digital radar signals for transmission by said first transceiver to said fiber optic cabling;
    a second network unit coupled to said second transceiver, being adapted to, in said first mode, decode said digital radar signals received by said second transceiver from said fiber optic cabling,
    wherein said first and second network units handle said digital radar signals according to a predetermined network protocol.

5. The weather radar signal path of claim 4, wherein said digital radar signals are formatted as UDP/IP datagrams.

6. The weather radar signal path of claim 4, wherein:
    said processing unit is adapted to, in a second mode, generate control commands to operate said antenna,
    said second transceiver is adapted to, in said second mode, transmit said control commands from said processing unit to said first transceiver through said fiber optic cabling,
    said first transceiver is adapted to, in said second mode, forward said control command to said antenna.

7. The weather radar signal path of claim 1, further comprising:
    additional detection sensor (207) and a second fiber optic cabling,
    wherein said additional detection sensor is adapted to detect the presence of a predetermined occurrence, said additional detection sensor is coupled to said processing unit through said second fiber optic cabling.

8. A weather radar signal path for communication between an antenna and a processing unit of an aircraft, said signal path comprising:
    an analog-digital converter ("ADC"), a digital down-converter ("DDC"), a digital signal processor ("DSP"), a first Ethernet unit, a first optical transceiver, fiber optic cabling, a second optical transceiver, and a second Ethernet unit, WHEREIN, said ADC, coupled between said antenna and said DDC, is adapted to convert received radar signals from said antenna into digital signals, said DDC is adapted to convert said digital signals to baseband digital signals, said DSP is adapted to, in a first mode, direct said first Ethernet unit to encode said baseband digital signals for transmission by said first optical transceiver to said fiber optic cabling, said second optical transceiver is adapted to, in said first mode, receive said baseband digital signals from said fiber optic cabling, said second Ethernet unit is adapted to, in said first mode, decode said received baseband digital signals for further processing by said processing unit.

9. The weather radar signal path of claim 8, wherein:

said second Ethernet unit and said second optical transceiver are adapted to, in a second mode, encode and transmit control commands issued by said processing unit to said fiber optic cabling, said fiber optic cabling is adapted to, in said second mode, transfer said control commands to said first optical receiver, said first Ethernet unit and said first optical transceiver are adapted to, in said second mode, receive and decode said control commands from said fiber optic cabling, said DSP is adapted to, in said second mode, generate instructions to operate said antenna based on said control commands received from said first Ethernet unit and said first optical transceiver.

10. The weather radar signal path of claim 9, wherein said fiber optic cabling are adapted to transfer signals in UDP/IP datagram format.

11. The weather radar signal path of claim 8, wherein said fiber optic cabling are adapted to transfer signals in UDP/IP datagram format.

12. The weather radar signal path of claim 11, wherein said DDC comprises:

a IQ sample unit adapted to convert digital signals from said ADC to in-phase and out-of-phase quadrature samples;

a filter adapted to filter said samples from said IQ sample unit using a cascaded integrator-comb filter and a finite impulse response filter;

a decimation unit coupled to said filter, being adapted to decimate said samples to baseband signals;

a gain control adapted to amplify said baseband signals;

a formatting unit adapted to format said baseband signals into streams of digital words for said DSP.

13. The weather radar signal path of claim 8, further comprising:

an additional detection sensor and a second fiber optic cabling, wherein said additional detection sensor is adapted to detect a predetermined event and generate digital signals representative of the detection, and said second fiber optic cabling is adapted to transmit said digital signals to said processing unit for analysis.

14. A method of conducting a weather radar signal path for an aircraft, the method comprising:

receiving, using an antenna, in a first mode, reflected radar signals from atmosphere ahead;

converting, using a digital down-converter, said reflected radar signals received by said antenna into digital radar signals at a lower frequency;

transmitting, using a first transceiver, in said first mode, to transmit said digital radar signals through said fiber optic cabling;

transferring, through fiber optic cabling, in said first mode, said digital radar signals from said first transceiver;

receiving, using a second transceiver, in said first mode, said digital radar signals from said fiber optic cabling;

processing, using a processing unit, in said first mode, said digital radar signals to generate weather information based on predetermined algorithm.

15. The method of claim 14, further comprising:

transferring, using a waveguide (110) coupled to said antenna and said digital down-converter, said reflected radar signals from said antenna to said digital down-converter.

16. The method of claim 15, further comprising:

packetizing and encoding, using a first network unit, in said first mode, said digital radar signals for transmission by said first transceiver to said fiber optic cabling;

decoding, using a second network unit, in said first mode, said digital radar signals received by said second transceiver from said fiber optic cabling;

wherein said first and second network units handle said digital radar signals according to a predetermined network protocol.

17. The method of claim 14, further comprising:

packetizing and encoding, using a first network unit, in said first mode, said digital radar signals for transmission by said first transceiver to said fiber optic cabling;

decoding, using a second network unit, in said first mode, said digital radar signals received by said second transceiver from said fiber optic cabling;

wherein said first and second network units handle said digital radar signals according to a predetermined network protocol.

18. The method of claim 17, wherein said digital radar signals are formatted as UDP/IP datagrams.

19. The method of claim 17, wherein:

said processing unit also generates control commands to operate said antenna, said second transceiver is adapted to, in said second mode, transmit said control commands from said processing unit to said first transceiver through said fiber optic cabling, said first transceiver is adapted to, in said second mode, forward said control command to said antenna.

20. The method of claim 14, further comprising:

detecting the presence of a predetermined event;

communicating the detection to said processing unit through a second fiber optic cabling.

* * * * *